United States Patent [19]

Kulig et al.

[11] 3,776,342

[45] Dec. 4, 1973

[54] APPARATUS FOR TRANSFERRING ARTICLES BETWEEN MOVING CONVEYORS

[75] Inventors: Constantine W. Kulig, Windsor; Alexander H. Rydlewicz, Manchester, both of Conn.

[73] Assignee: Emhart Corporation, Bloomfield, Conn.

[22] Filed: Jan. 27, 1972

[21] Appl. No.: 221,176

[52] U.S. Cl. .......................... 198/20 R, 198/31 AA
[51] Int. Cl. ............................................ B65g 47/00
[58] Field of Search .................... 198/20, 31 AA; 214/1 BC

[56] References Cited
UNITED STATES PATENTS

| | | | |
|---|---|---|---|
| 2,610,746 | 9/1952 | Steck | 214/1 BC |
| 3,550,789 | 12/1970 | Jaeger et al. | 214/1 BC |
| 1,867,389 | 7/1932 | Sylvester | 198/31 AA |
| 1,906,605 | 5/1933 | Hutchinson | 198/20 R |
| 3,373,880 | 3/1968 | Dubesset | 214/1 BC |

*Primary Examiner*—Richard E. Aegerter
*Assistant Examiner*—Joseph E. Valenza
*Attorney*—John C. Linderman

[57] ABSTRACT

An apparatus for transferring articles between two moving and perpendicularly oriented conveyors employs a parallel-crank, four-bar linkage suspended from a structural frame to support an article clamping mechanism. The motions of the orbital link and the clamping mechanism are synchronized with and in the same direction as the motions of the articles on the conveyors at pick-up and discharge positions on the conveyors. A cam drive mechanism is utilized to modulate the orbital speeds of the link in systems in which the two conveyors operate at different speeds. An elevating mechanism is also driven in synchronism with the four-bar linkage to raise and lower the linkage and the clamping mechanism at the pick-up and discharge positions. The clamping mechanism incorporates rotatable shafts to open and close a plurality of resilient fingers which engage the articles with a controlled degree of pressure. A cam and cam follower operated by the four-bar linkage adjust the amounts by which the resilient fingers open and close at both the pick-up and the discharge positions.

6 Claims, 6 Drawing Figures

APPARATUS FOR TRANSFERRING ARTICLES BETWEEN MOVING CONVEYORS

BACKGROUND OF THE INVENTION

The present invention relates to equipment used to handle articles transported on conveyors. More particularly, the present invention resides in an apparatus that is used to transfer the articles between two moving conveyors with a minimum of disturbance to the articles themselves.

In certain manufacturing processes articles travelling serially in alignment along one conveyor must be transferred onto another conveyor for subsequent operations. For example, in glassware forming machinery, a series of newly formed bottles travelling in line on a cross conveyor moving at a given speed are transferred to a slower moving lehr conveyor on which the bottles are arranged in a series of parallel ranks for movement through a lehr which anneals the glass. Many transfer mechanisms used in the past have relied upon a push bar to slide the bottles laterally off the cross conveyor, over a deadplate and onto the end of the lehr conveyor oriented perpendicularly to the cross conveyor. Pushing hot containers over a deadplate can scuff and scratch their bottoms, and often causes thermal checks in this critical area. The scuffed bottom can later be the cause of a container failure. Increased production rates provided in part by individual section (IS) machines have required that the bottles be moved more rapidly at higher conveyor speeds. While it is relatively easy to increase the speeds of the conveyors, increasing the speed of conventional pusher-type transfer apparatus can result in damage to the body of bottles. As a consequence, high speed transfer apparatus utilizes a pick-up mechanism to lift the bottles off the cross conveyor and deposit them on the end of the lehr conveyor. A mechanism of this type is shown and described in U. S. Pat. No. 3,373,880 issued Mar. 19, 1968.

In glassware transfer machines incorporating the pick-up mechanism, it is important that such mechanism gently engage the bottles while they are being transferred between the conveyors. Since the bottles are about to enter the lehr, they have not been annealed and may be damaged to the point of causing eventual fracture if handled too roughly.

It is also desirable for a given transfer mechanism to be adjustable so that different sizes and shapes of bottles can be handled by the same mechanism. For example, if the transfer apparatus picks up the bottles by the neck, it is desirable to have an adjustable gripping mechanism so that both wide-mouth and narrow-mouth bottles can be transferred by the same basic apparatus.

In transferring the bottles onto a lehr conveyor in a series of parallel ranks, it is important that the engaging mechanism not interfere with previously deposited ranks of bottles. For example, the gripping mechanism must open to release one rank of bottles on the lehr conveyor without disturbing the previously deposited rank. To avoid interference it is desirable to limit the degree of opening of the gripping means at the depositing position by an amount which may not be acceptable at the pick-up position due to slight misalignments of the incoming series of bottles on the cross conveyor leading into the transfer apparatus.

It is accordingly a general object of the present invention to provide a transfer apparatus that can move articles from one conveyor to another with a minimum of disturbance to the articles being transferred and the adjacent articles.

SUMMARY OF THE INVENTION

The present invention resides in an apparatus for transferring articles between a first conveyor on which the articles move serially in a line and a second, generally transverse conveyor on which the articles move in a series of parallel ranks. The apparatus includes a structural frame having a generally upright operating position adjacent the conveyors. A parallel-crank, four-bar linkage is suspended from the frame and has an orbital link connected between the parallel cranks parallel to the line and ranks of articles on the conveyors for translation by the cranks parallel to the conveyor motions at a first position, such as the pick-up position over the first conveyor, and a second position, such as the discharging position over the second conveyor.

Elevation means are connected between the structural frame and the orbital link of the four-bar linkage for adjusting the elevation of the orbital link relative to the conveyors. Drive means is connected in driving relationship to each of the parallel cranks of the four-bar linkage for translating the orbital link over the first and second conveyors at speeds synchronized with the conveyor speeds at the first and second positions.

Clamping means is suspended from the orbital link of the four-bar linkage for engaging and releasing the articles at the first and second positions. The clamping means includes an article-gripping shaft mounted to the orbital link for rotation about an axis parallel to the link and a plurality of resilient article-engaging fingers for gently engaging the articles during the transfer operation. Mechanisms are provided to limit the rotation of the gripping shaft and the pressure applied to the articles by the resilient fingers so that the fingers do not damage the articles during transfer or interfere with adjacent articles on the first and second conveyors.

DESCRIPTION OF THE PREFERRED EMBODIMENT

Figure 1:
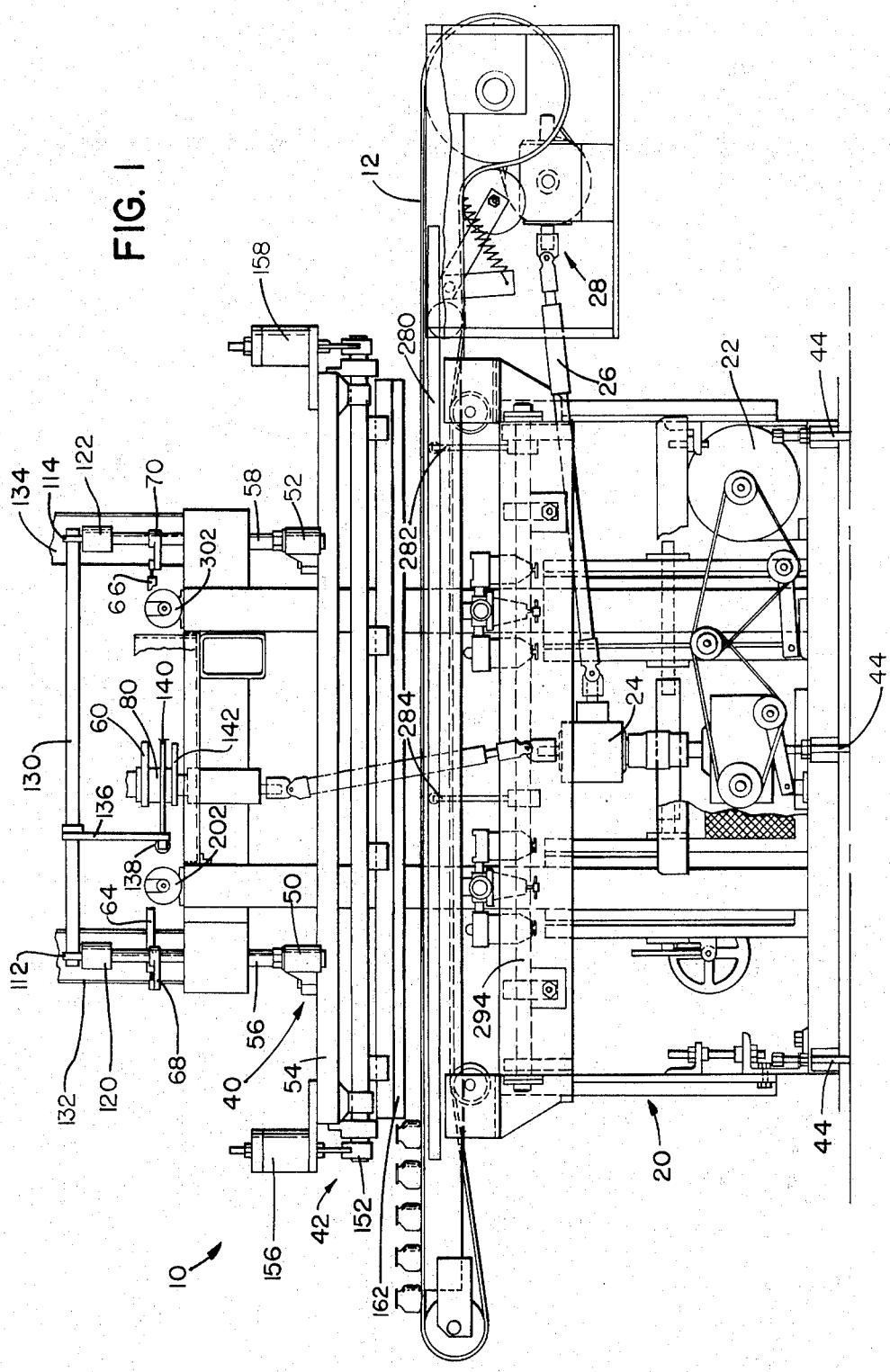
FIG. 1 is a front elevational view of a transfer apparatus embodying the present invention.
Figure 2:
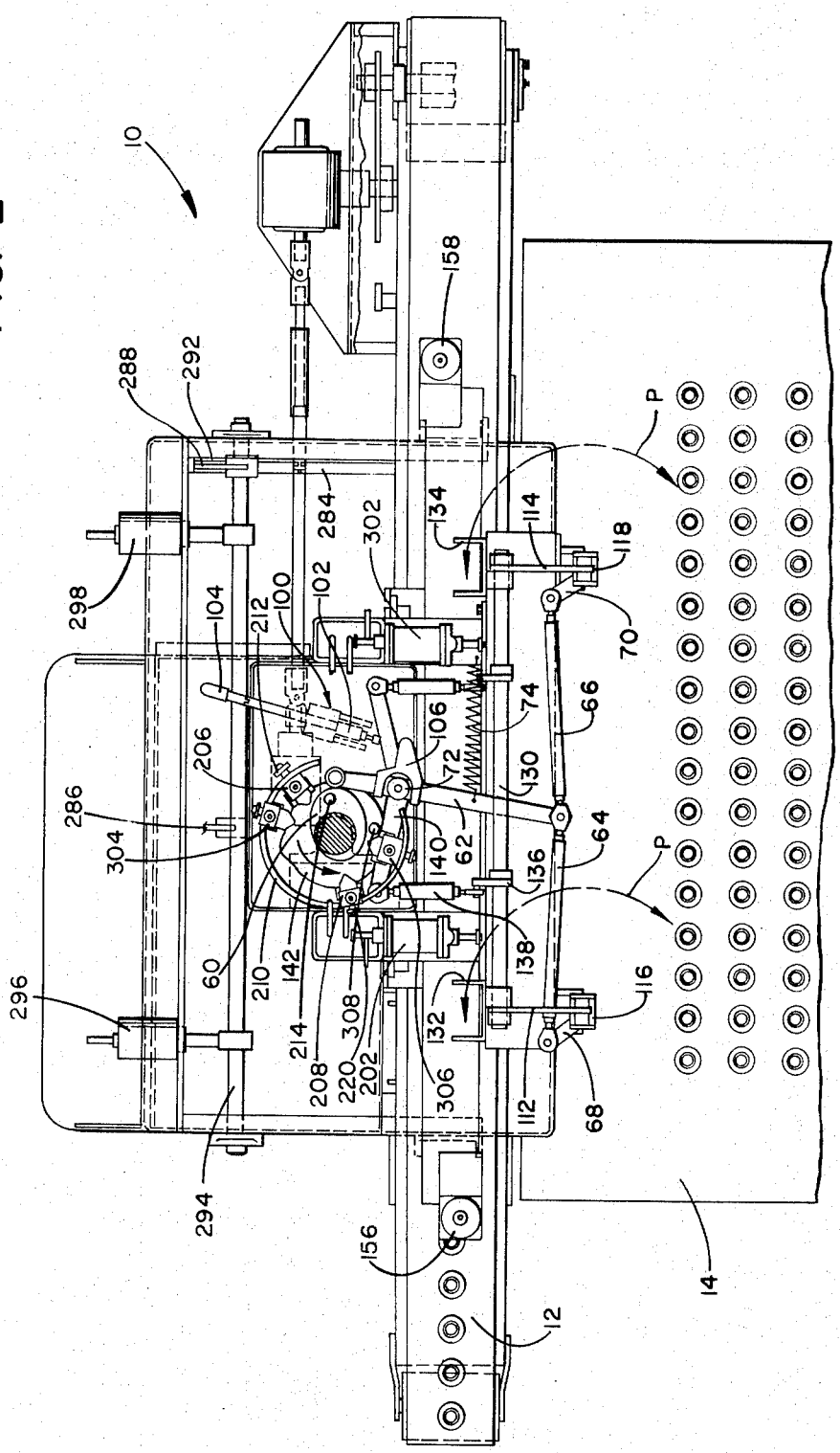
FIG. 2 is a top plan view of the transfer apparatus shown in FIG. 1.
Figure 3:
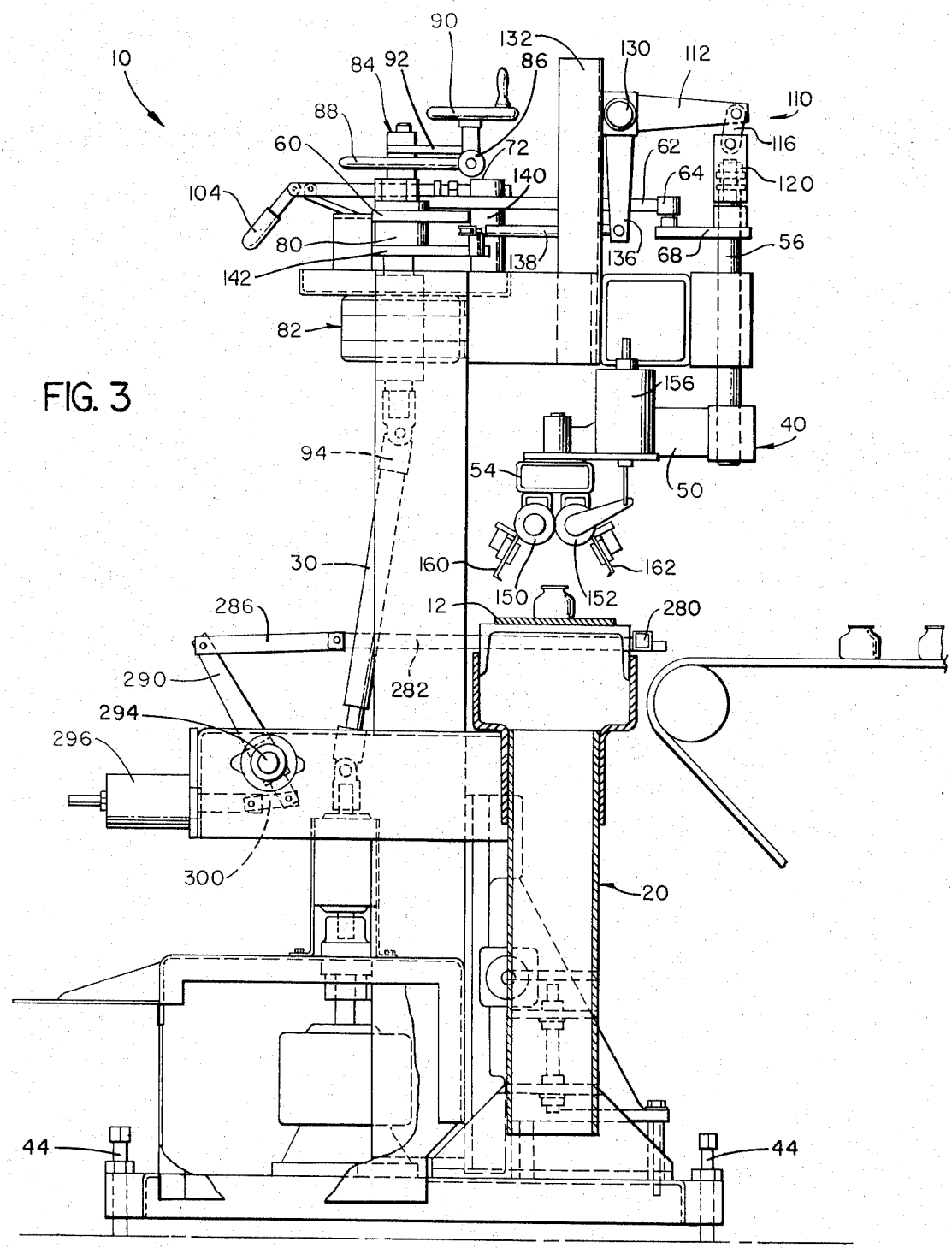
FIG. 3 is a side elevation view of the transfer apparatus shown in FIG. 1.

The transfer apparatus embodying the present invention and generally designated 10 in FIGS. 1, 2 and 3 is capable of operating with many different articles but has particular utility in the glassware industry for transferring glass containers or bottles between two perpendicular conveyors. For this reason, the invention is described hereinafter in the embodiment of a machine for transferring glass bottles from a cross conveyor 12 on which the bottles travel serially in a line onto a lehr conveyor 14 on which the bottles are translated in a series of parallel ranks. It will be assumed for the purposes of description that the bottles move serially toward the right-hand end of the cross conveyor 12 in FIGS. 1 and 2 from the output conveyor of a glassware forming machine and move in a line on the conveyor 12 under the transfer apparatus 10. The apparatus performs a cyclic operation in which the bottles are picked up from the cross conveyor 12 in groups of a specified number and are moved in an arcuate motion onto the end of the lehr conveyor 14 to form a rank of bottles parallel to the incoming line of bottles on the cross conveyor 12. The cyclic operation of the transfer apparatus forms a series of parallel ranks of bottles on the lehr conveyor 14 as seen most clearly in FIG. 2.

The transfer apparatus 10 has a structural frame, generally designated 20, which serves as a support for the cross conveyor 12 and the mechanical components which perform the transfer operation. A drive motor 22 mounted in the base of the frame 20 serves as the principal power source for the conveyor 12 and the mechanical components of the transfer apparatus. The driving motions of the motor 22 are transmitted through a system of pulleys and belts and a 90° gear unit 24 having one output shaft 26 connected to the cross conveyor dirve mechanism 28 and another output shaft 30 which drives the mechanical components of the transfer apparatus 10. By utilizing the common drive motor 22, and the gear unit 24, the operations of the transfer apparatus 10 are synchronized with the motions of the bottles on the cross conveyor 12.

The principal components of the transfer apparatus 10 include a parallel-crank, four-bar linkage 40 which is suspended from the frame 20 and a mechanical clamping mechanism 42 suspended from the four-bar linkage 40 for movement between a pickup position over the cross conveyor 12 and a discharge position over the lehr conveyor 14. It should be understood, however, that the transfer operation could be reversed so that the ranks of bottles at the discharge end of the lehr conveyor could be picked up and deposited on the cross conveyor in a line. The reversal of the transfer operation can be accomplished by changing the timing of the various functions executed by the transfer apparatus, particularly the opening and closing of the clamping mechanism 42 at the pick-up and discharge positions of the mechanism on the two conveyors.

The four-bar linkage 40 includes two parallel cranks 50 and 52 and an orbital link 54 journaled in the projecting ends of the cranks. The frame 20 is positioned adjacent the receiving end of the lehr conveyor 14 in a level, upright condition on leveling jacks 44 so that the parallel cranks 50 and 52 and the orbital link 54 lie generally in a horizontal plane and the link 54 extends parallel to the line of bottles on the conveyor 12 and the ranks of bottles on the conveyor 14. At the pickup position over the conveyor 12, the orbital link 54 is generally centered over the line of bottles and is orbited tangentially of the center line of the bottles by the cranks 50 and 52 in the same direction of travel as the bottles on the conveyor 12. The cranks 50 and 52 are rotated by means of a drive mechanism including the two vertical and rotatable drive shafts 56 and 58 to which the cranks 50 and 52 are connected respectively. The cranks 50 and 52 rotate the link 54 from the pickup position over conveyor 12 to a discharge position over the lehr conveyor 14 where the orbital link has the same direction of travel as the conveyor 14.

The paths followed by the projecting ends of the cranks, and therefore the orbital link, are represented by the two arcuate paths P shown in FIG. 2 having an arc length of approximately 120°.

For minimal disturbance to the bottles during transfer, the drive mechanism which produces the rotational movement of the cranks is selected to synchronize the translation of the link 54, and therefore the clamping mechanism 42, with the speed of the bottles on the conveyors at both the pickup and discharge positions. In other words, the cross conveyor 12 operates at a higher speed than the lehr conveyor 14, and the drive mechanism connected to the four-bar linkage 40 produces a modulated rotational speed of the cranks 50 and 52.

The drive mechanism includes a cam 60 and cam follower 62 which is connected by a pair of tie rods 64 and 66 to driving cranks 68 and 70 on the shafts 56 and 58 respectively. The cam follower 62 is pivotally mounted on a rocker shaft 72 fixed to the frame 20 and is held in engagement with the cam 60 by means of the biasing spring 74. The cam 60 is fixedly secured to a vertical sleeve 80 journaled in an upper drive housing 82. The sleeve 80 is connected to the drive shaft 30 by means of a mechanical synchronizer 84 which is also journaled in the housing 82. The synchronizer 84 includes a worm 86 and a pinion gear 88 which can be rotated relative to one another by means of the crank wheel 90 to cause the worm to move in a planetary fashion about the pinion 88. The pinion is fastened to the sleeve 80 and the worm 86 is connected through a supporting crank arm 92 to a drive shaft which is journaled in the housing 82 and connects to the drive shaft 30 through the universal joint 94. Since the drive shaft 30 and the drive shaft 26 are driven in common from the motor 22, the mechanical synchronizer 84 which rotates at low speeds with the cam 60 permits the motions of the parallel-crank four-bar linkage to be phased with the motions of the bottles on the conveyor 12 so that the clamping mechanism 42 does not close on the line of bottles on the conveyor 12 at a point in time when a bottle at one end of the mechanism is only partially within the grasp of the mechanism.

The profile of the cam 60 is selected to provide a speed of rotation of the cranks 50 and 52 which is synchronized with the speeds of the conveyors 12 and 14 at the pickup and discharge positions respectively. As the cam 60 rotates and causes the follower 62 to rock on shaft 72, the tie rods 64 and 66 cause the parallel cranks 50 and 52 to rotate through the arcuate paths P in FIG. 2 between the pickup and discharge positions. To prevent the four-bar linkage from operating in the event of a malfunction, for example replacement of fingers 164 and 166, a lockout mechanism 100 is provided. The mechanism is mounted to the drive housing 82 and includes a plunger 102 actuated mechanically by a manually operated toggle linkage 104 to cause the plunger to engage a latch 106 and hold the cam follower 62 against the forces of the biasing spring 74. In the actuated position, the lock out mechanism 100 holds the orbital link 54 over the center line of the bottles on the conveyor 12.

The transfer apparatus 10 also includes an elevating mechanism 110 most clearly seen in FIG. 3 which causes the clamping mechanism 42 to be raised and lowered at the pickup and discharge positions of the orbital link 54 so that the bottles are actually lifted off the conveyor 12 and set down upon the lehr conveyor 14 during the transfer operation. The elevating mechanism 110 also permits the transfer apparatus to operate between conveyors which lie in different horizontal planes.

The elevating mechanism 110 includes two cranks 112 and 114 which are connected to the drive shafts 56 and 58 by means of links 116 and 118 and journals 120 and 122. The drive shafts 56 and 58 are supported vertically by the journals 120 and 122 so that movements of cranks 112 and 114 cause the clamping mechanism 42 to be raised vertically relative to the conveyors 12 and 14. The cranks 112 and 114 are mounted on a rotatable torque tube 130 which is journaled in the uprights 132 and 134 of the frame 20. The tube 130 is rocked by means of a crank 136 and a push rod 138 which are connected with a cam follower 140 pivoted on the rocker shaft 72. The follower 140 is actuated by cam 142 which is also fixed to the sleeve 80 for rotation with the cam 60. Since the cams 60 and 142 are both connected to the sleeve 80, they rotate together and in this manner the elevating motions of the clamping mechanism 42 at the pickup and discharge positions over the conveyors are fixed in phase with the translational motions of the clamping mechanism 42 between the conveyors. It should also be noted that if the lockout mechanism 100 inhibits the translational motions of the clamping mechanism 42, the elevating mechanism continues to operate but without harmful effects.

It is an important feature of the present invention that the clamping mechanism 42 engages and releases the bottles on the conveyors with a minimum of disturbance to either the bottles being transferred or to other bottles adjacently spaced from the bottles being transferred. To this end, the clamping mechanism includes a pair of parallel gripping shafts 150 and 152 suspended beneath the orbital link 54 and rotatable relative to the link about axes parallel with the link and the line of bottles on the conveyor 12 by means of two piston and cylinder assemblies 156 and 158 respectively. As seen more clearly in FIGS. 4 and 5, the gripping shafts 150 and 152 have multiple section gripping strips 160 and 162 respectively comprised of a multiplicity of resilient tongs or fingers 164 and 166 respectively which are capable of gently engaging the lip of a bottle without undue pressure when the gripping shafts rotate the projecting ends of the tongs inwardly into engagement with the bottles. The strips 160 and 162 may be formed from 1/32 gauge steel with the fingers being one-fourth of an inch in width. The strips 160 and 162 are mounted to the gripping shafts 150 and 152 by means of adjustable supports 170 having a slide clamp 172 shiftable on a guide 174 and a strip clamp 176 connected to the slide clamp 172. The clamp 172 can be shifted on the guide 174 in order to locate the tongs 160 and 162 at the closed position shown in FIG. 5 in engagement with different sized bottles or other articles without undue pressure.

The gripping shafts 150 and 152 extend parallel to the orbital link 54 and are journaled for rotation about axes parallel to the orbital link by means of bearings 180 interposed between the link 54 and each end of the shafts 150 and 152. The piston and cylinder assembly 156 is connected to the shaft 152 by means of a link 184 and a crank 186 fixed to the shaft 152 and the other piston and cylinder assembly 158 is connected to the shaft 150 at the end of the orbital link 54 opposite from the assembly 156 by a similar link and crank arrangement. An interconnecting gear set 190 is mounted to the shafts 150 and 152 at one end and another inter-connecting gear set (not shown) is mounted to the shafts 150 and 152 at the other end so that the rotation of the shafts by the piston and cylinder assemblies 156 and 158 and the opening and closing of the resilient fingers 164 and 166 are synchronized. The cylinder assemblies 156 and 158 are actuated by means of a pressurized fluid such as compressed air delivered to the assemblies through a spool valve 202 shown in FIGS. 1 and 2. The spool valve 202 is actuated by the control valves 206 and 208 shown in FIG. 2 mounted in a cylindrical support 210 surrounding the cams 60 and 142. The control valve 206 is clamped in a circumferential slot in the support 210 by means of a clamp screw 212 and is actuated by a stud 214 fixedly mounted in the cam 60. The control valve 206 actuates spool valve 202 to the open position and allows high pressure air to be introduced into each of the cylinder assemblies 156 and 158 when the gripping shafts 150 and 152 are located at the pickup position over the conveyor 12. When actuated, the cylinder assemblies 156 and 158 rotate the gripping shafts and cause the resilient fingers 164 and 166 to sweep inwardly and engage the bottles which are then located on the conveyor 12 between the fingers. The simultaneous actuations of the cylinder assemblies 156 and 158 by the control valve 206 and the mating gear sets on the shafts 150 and 152 cause the fingers 164 and 166 to close and also insure that the shaft rotations and finger displacements are substantially the same and are synchronized so that the bottles are engaged by the fingers at diametrically opposite sides at the same time. Once the control valve 206 has actuated the spool valve 202, the spool valve remains open and continues to hold the resilient fingers of the strips 160 and 162 in engagement with the bottles until the four-bar linkage 40 has translated the clamping mechanism 42 over the end of the lehr conveyor 12 to the discharge position.

When the clamping mechanism has reached the discharge position, spool valve 202 is shuttled by the control valve 208 which is mounted in the circumferential slot on the support 210 by the clamping screw 220 and also actuated by the stud 214 on the cam 60. When the spool valve 202 is shuttled by the control valve 208, it causes the cylinder assemblies 156 and 158 to rotate the gripping shafts 150 and 152 and the resilient fingers 164 and 166 of strips 160 and 162 in the opening direction to discharge or release the engaged bottles on the lehr conveyor 14. It will be understood that the timing of the translating and elevating motions of the four-bar linkage 40 and the engaging and disengaging motions of the resilient fingers are determined by the positioning of the cams 60 and 142 and the relative location of the control valves 206 and 208 and the stud 214 on the cam 60. The timing of the finger motions can be adjusted relative to the translating and elevating motions by shifting the positions of the control valves 206 and 208 on the cylindrical support 210. Such adjustment is made by loosening the clamping screws 212 and 220 and shifting the valves in the circumferential slot in the support 210. It will be noted that the support 210 permits adjustment of the control valve positions by more than 180° around the cams 60 and 142. It is, therefore, possible to change the operating cycle of the transfer apparatus so that the pickup operation is timed to occur over the lehr conveyor 14 and the discharge operation is timed to occur over the cross conveyor 12. The apparatus is therefore versatile and can be utilized to unload the bottles from the discharge end of the lehr conveyor 14.

The piston and cylinder assemblies 156 and 158 which open and close the resilient fingers on strips 160 and 162 are provided with stop screws, such as the stop screw 230 (FIG. 4) connected to cylinder assembly 156 to limit the upward stroke of the pistons and, therefore, the opening of the resilient fingers 164 and 166 at the pickup position. By adjusting the opening, the operating time for moving the fingers 164 and 166 to the closed position about the bottles can be reduced for more rapid operation or alternatively, the open position of the fingers can be increased to accommodate an irregular alignment of the bottles on the conveyor 12.

Figure 4:
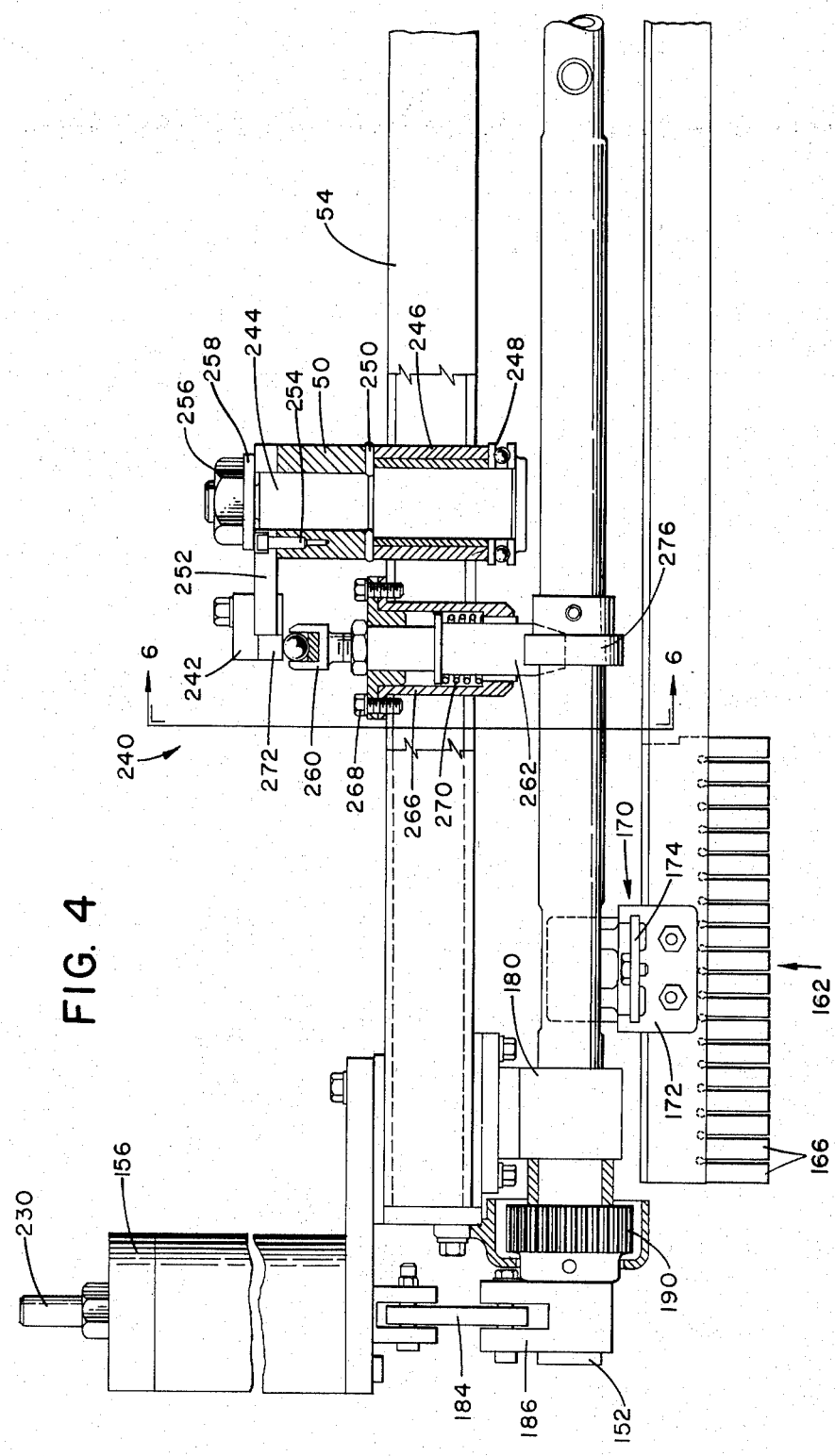
FIG. 4 is a frontal view of the clamping mechanism which engages the articles on the conveyors.
Figure 5:
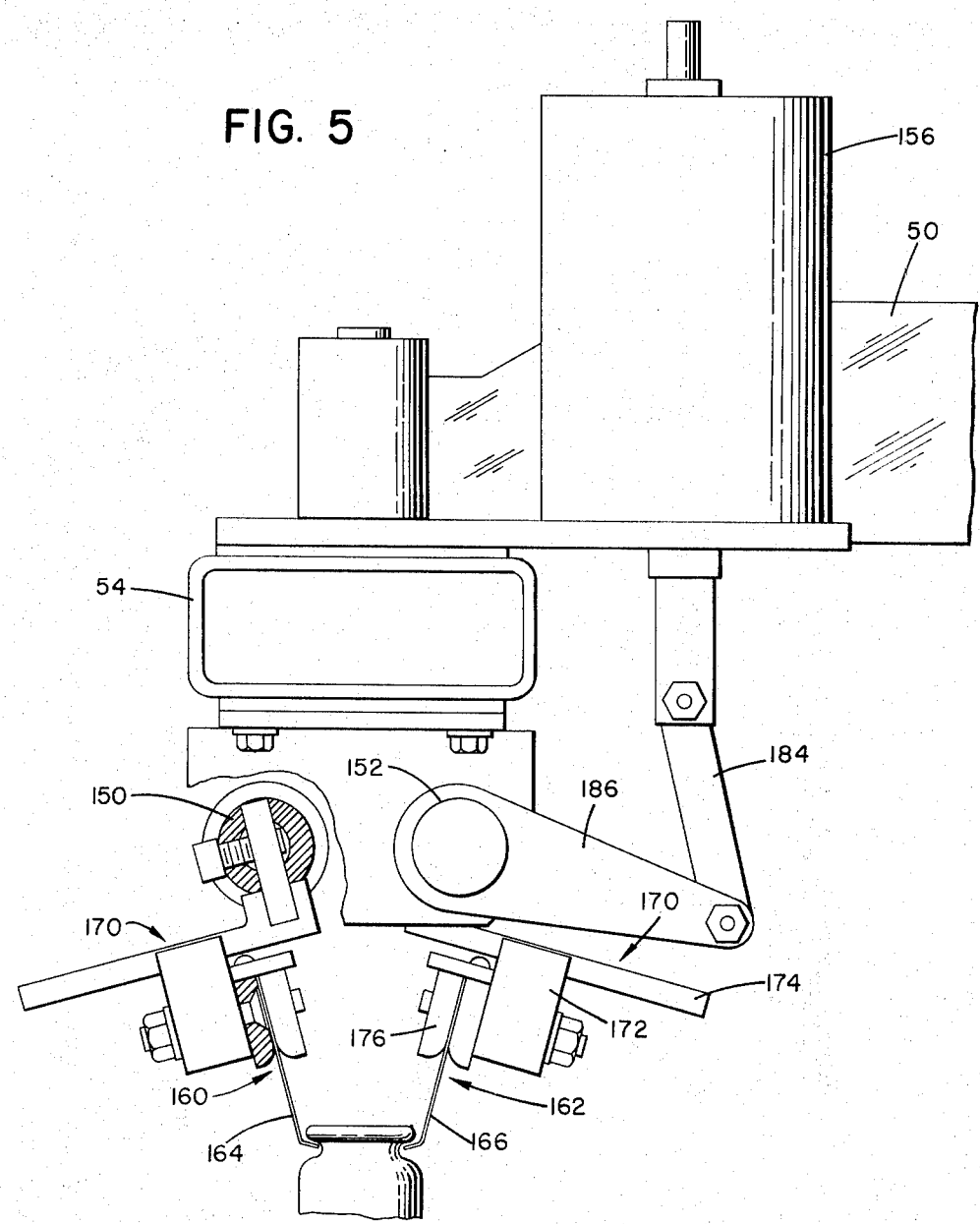
FIG. 5 is a side view of the clamping mechanism shown in FIG. 4.
Figure 6:
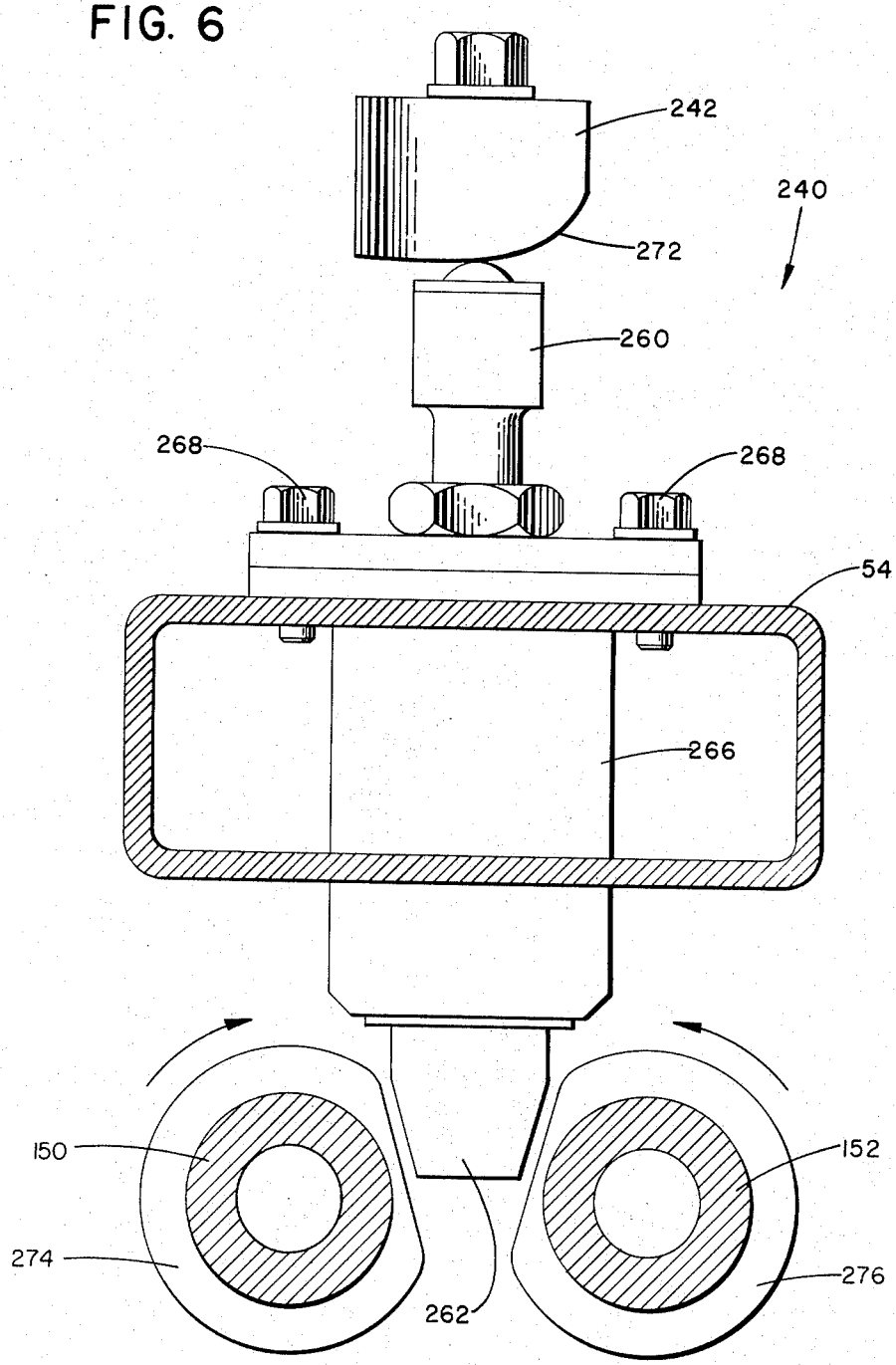
FIG. 6 is a sectional view of the clamping mechanism showing the adjustable limit stop as seen along the sectioning line 6—6 in FIG. 4.

An adjustable limit stop mechanism 240 shown in FIGS. 4 and 6 is also provided to limit the open position of the resilient fingers 164 and 166 at the discharge position over the lehr conveyor 14. The limit stop mechanism 240 is adjusted by the displacement of the orbital link 54 from the pickup to the discharge positions so that the open position of the fingers at the discharge position over the lehr 14 is different from the open position of the fingers at the pickup position over the cross conveyor 12. As mentioned above, the bottles on the cross conveyor 12 may not be in precise alignment near the center of the conveyor so that it is desirable to provide by means of the stop screw 230 an adequate clearance between the bottles and the resilient fingers as the four-bar linkage 40 is lowered by the elevating mechanism 110 over the incoming bottles at the pickup position. On the other hand as a rank of bottles is deposited on the lehr conveyor 14 at the discharge position, the rotation of the gripping shafts 150 and 152 must be limited so that the fingers 166 on the strip 162 do not swing outwardly and interfere with the adjacent rank of bottles discharged during the immediately preceding transfer cycle.

The limit mechanism 240 reduces the rotation of the shafts 150 and 152 at the discharge position by means of a cam and cam follower assembly which is operated by the relative movement between the crank 50 and the orbital link 54 during the arcuate motion of the crank between the pickup and discharge positions. A cam 242 is mounted in cantilever fashion to the crank 50 at the connection between the crank 50 and the link 54 provided by the journal assembly including a connecting pin 244, a connecting nut 256, a lock washer 258, a journal bearing 246, an end bearing 248 and an intermediate washer 250. The cam 242 is fixed to a bracket 252 which is fastened to the projecting end of the crank 50 by a countersunk cap screw 254 under the connecting nut 256 and the lock washer 258. A cam follower 260 is threadably mounted in a spring biased stop member or plunger 262 held in the orbital link 54 by a cylindrical housing 266 and bolts 268. A biasing spring 270 within the housing 266 urges the plunger 262 upwardly and forces the cam follower 260 into contact with the camming surface 272 of the cam 242. The lower end of the plunger 262 is tapered and projects downwardly toward two bushes 274 and 276 mounted respectively on the shafts 150 and 152. As the parallel-crank four-bar linkage 40 rotates the clamping mechanism 42 to the discharge position over the lehr conveyor 14, the cam 242 connected to crank 50 pushes the plunger 262 downwardly between the flats on the bushes 274 and 276. When the cylinder assemblies 156 and 158 are actuated to open the resilient fingers holding the bottles, the shafts 150 and 152 rotate in the direction indicated by the arrows in FIG. 6 until the flats on the bushes 274 and 276 contact the plunger 262 and stop further rotation of the shafts. By adjusting the combined length of the cam follower 260 and the plunger 262, the rotational positions of the shafts 150 and 152 at which rotation is stopped can be set to allow the resilient fingers 164 and 166 to open by an amount sufficient to deposit the rank of bottles on the lehr conveyor 14 without having the fingers 166 contact the adjacent rank of bottles. In this manner, disturbing the adjacent rank or ranks of bottles at the discharge position is avoided.

As the clamping mechanism 42 is translated back toward the pickup position over the cross conveyor 12 by the four-bar linkage 40, the cam 242 is rotated relative to the cam follower 260 and allows the biasing spring 270 to urge the plunger 262 upwardly and entirely out of engagement with the flats on the bushes 274 and 276. With pressure still applied to the piston and cylinder assemblies 156 and 158 through the spool valve 202 and the plunger 262 withdrawn from between the bushes 274 and 276, further rotation of the shafts 150 and 152 in the directions indicated by the arrows of FIG. 6 brings the resilient fingers on strips 160 and 162 to the fully opened position set by the stop screw 230 in preparation for picking up another group of incoming bottles on the conveyor 12. The limit mechanism 240, therefore, sets the open position of the resilient fingers at the discharge position to a limit different from the setting at the pick up position.

A scavenger bar 280 most clearly shown in FIGS. 1 and 3 is reciprocated horizontally over the end of the lehr conveyor 14 adjacent the cross conveyor 12 to insure that the region swept by the rank of bottles in the clamping mechanism 42 is clear before the rank of bottles is set down. The scavenger bar 280 is supported on a pair of rods 282 and 284 which are slidably mounted in guide bushings (not shown) below the upper portion of conveyor 12. The rods 282 and 284 are in turn joined to connecting links 286 and 288 which are driven respectively by the cranks 290 and 292 fixedly mounted on a torque shaft 294. The torque shaft 294 is oscillated by a pair of piston and cylinder assemblies 296 and 298 which are connected through a pair of crank arms and connecting links 300 to the torque shaft 294. The cylinder assemblies 296 and 298 are operated simultaneously in the same manner as the piston and cylinder assemblies 156 and 158 through another spool valve 302 and control valves 304 and 306 mounted on the cylindrical support 210. A stud 308 on the cam 142 actuates the control valves 304 and 306. The operation of the assemblies 296 and 298 by the control valves 304 and 306 and the stud 308 is timed to reciprocate the scavenger bar 280 back and forth over the end of the lehr conveyor 14 during the interval of the transfer operation in which the four-bar linkage 40 returns to the pickup position after depositing a rank of bottles at the discharge position on the conveyor 14. In this manner, the scavenger bar 280 assures that the region adjacent the discharge position on the conveyor 14 is clear before the next rank of bottles is deposited.

It will thus be seen that the apparatus 10 for transferring the bottles from one conveyor to another performs the transfer operation with a minimum of disturbance to the bottles as they are being transferred and also to adjacent bottles on each of the conveyors. The driving mechanism synchronizes the speed of the clamping mechanism 42 with the speeds of the conveyors at both the pickup and discharge positions so that there is negligible or zero speed differential between the bottles and the clamping mechanism as they are engaged or disengaged by the fingers. The cam 60 may be provided with a profile which causes the parallel cranks 50 and 52 to accelerate or, more commonly, decelerate the speed of the bottles to a speed matching that of the lehr conveyor 14. The mechanical synchronizer 84 permits the motions of the clamping mechanism to be phased with the motion of the bottles on the conveyor 12 so that the bottles at the pickup position are fully engaged by the resilient fingers 164 and 166. The limit mechanism 240 assures that bottles adjacent the discharge position are not disturbed as a subsequent rank of bottles is deposited. It will thus be seen that the transfer apparatus 10 provides a smooth operating and a continuous transfer process with a minimum of disturbance to the bottles.

We claim:

1. Apparatus for transferring articles between a first conveyor on which the articles move serially in a line and a second, generally transverse conveyor on which the articles move in a series of parallel ranks comprising: a structural frame having a generally upright operating position; a parallel-crank, four-bar linkage including two parallel cranks suspended from the frame and having an orbital link connected between the parallel cranks parallel to the line and ranks of articles on the conveyors, the link being translated by the cranks parallel to the conveyor motions at a first position over the first conveyor and a second position over the second conveyor; elevation means connected between the structural frame and the orbital link of the four-bar linkage for adjusting the elevation of the orbital link relative to each of the conveyors; drive means connected in driving relationship to each of the parallel cranks of the four-bar linkage for translating the orbital link over the first and second conveyors at speeds synchronized with the conveyor speeds at the first and second positions; clamping means suspended from the orbital link of the four-bar linkage for engaging and releasing the articles at the first and second positions over the conveyors, the clamping means including a pair of article-gripping shafts mounted to the orbital link and rotatable about axes parallel to the orbital link, a plurality of resilient, article-engaging fingers extending from each shaft for rotation with the shafts and actuating means connected to the pair of article-gripping shafts for rotating the shafts about the parallel axes to cause the resilient, article-engaging fingers to open and close about articles on the conveyors; and adjustable stop means operated by at least one of the parallel cranks and connected with the orbital link and the pair of article-gripping shafts for limiting the rotation of the shafts and the fingers in the opening direction at the second position of the link and parallel cranks without limiting the rotation of the shafts at the first position.

2. Apparatus for transferring as defined in claim 1 wherein the adjustable stop means includes a cam mounted to one of the cranks of the parallel-crank, four-bar linkage and an adjustable stop member connected with a cam follower mounted on the orbital link adjacent the cam and the one of the cranks whereby relative movement of the orbital link and the one of the cranks causes the cam and cam follower to adjust the stop member.

3. Apparatus as defined in claim 2 wherein: the adjustable stop member has a tapered end projecting from the orbital link toward the pair of parallel gripping shafts; and the adjustable stop means further includes a pair of bushes mounted respectively on the pair of rotatable gripping shafts adjacent the adjustable stop member, each bush having a flat on the peripheral surface disposed to contact the tapered end of the adjustable stop member at selected adjustment positions of the stop member.

4. Apparatus for transferring articles as defined in claim 1 wherein the drive means includes a cam and cam follower connected in driving relationship to the parallel cranks of the four-bar linkage and providing different synchronized speeds at the first and second positions of the orbital link.

5. Apparatus for transferring articles as defined in claim 1 further including a scavenger bar mounted to the structural frame parallel to the ranks of the articles on the second conveyor and actuating means connected to the scavenger bar for reciprocating the scavenger bar toward and away from the ranks of articles on the second conveyor in timed relationship with the translation of the orbital link between the first and second positions.

6. Apparatus for transferring articles as defined in claim 1 wherein the elevation means includes a cam and cam follower connected in driving relationship with the driving means for adjusting the elevation of the orbiting link relative to the conveyors in synchronism with the translation of the orbital link between the first and second positions.

* * * * *